US010512142B2

(12) United States Patent
Hoshi

(10) Patent No.: US 10,512,142 B2
(45) Date of Patent: Dec. 17, 2019

(54) LIGHTING CONTROL PROGRAM UPDATE SYSTEM, UPDATE DEVICE, LIGHTING DEVICE, AND LIGHTING CONTROL PROGRAM UPDATE METHOD

(71) Applicant: PANASONIC INTELLECTUAL PROPERTY MANAGEMENT CO., LTD., Osaka (JP)

(72) Inventor: Koji Hoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/248,448

(22) Filed: Jan. 15, 2019

(65) Prior Publication Data

US 2019/0230771 A1 Jul. 25, 2019

(30) Foreign Application Priority Data

Jan. 19, 2018 (JP) ................................ 2018-006831

(51) Int. Cl.
*H05B 37/02* (2006.01)
*H04W 8/22* (2009.01)
*G05B 19/042* (2006.01)

(52) U.S. Cl.
CPC ....... *H05B 37/0272* (2013.01); *G05B 19/042* (2013.01); *H04W 8/22* (2013.01); *G05B 2219/25064* (2013.01)

(58) Field of Classification Search
CPC ... H05B 37/0272; H04W 8/22; G05B 19/042; G05B 2219/25064
See application file for complete search history.

(56) References Cited

U.S. PATENT DOCUMENTS

2012/0330887 A1* 12/2012 Young ..................... H04L 67/10 707/610
2014/0133656 A1* 5/2014 Wurster ................ H04L 9/0637 380/270
2017/0202069 A1 7/2017 Hidaka et al.

FOREIGN PATENT DOCUMENTS

JP 2017-123319 A 7/2017

* cited by examiner

*Primary Examiner* — Douglas W Owens
*Assistant Examiner* — Jianzi Chen
(74) *Attorney, Agent, or Firm* — McDermott Will & Emery LLP

(57) ABSTRACT

A lighting control program update system includes a wireless operation device, a plurality of lighting devices, and an update device. The wireless operation device outputs an operation instruction including first wireless operation device ID information. When the first wireless operation device ID information included in the operation instruction matches second wireless operation device ID information stored in the lighting devices, the lighting devices perform an operation in response to the operation instruction. The update device broadcasts a control program update instruction including third wireless operation device ID information that is identical to the first wireless operation device ID information to the lighting devices. When the third wireless operation device ID information matches the second wireless operation device ID information stored in the lighting devices, the lighting devices update a control program stored in response to the control program update instruction.

11 Claims, 2 Drawing Sheets

LIGHTING CONTROL PROGRAM UPDATE SYSTEM, UPDATE DEVICE, LIGHTING DEVICE, AND LIGHTING CONTROL PROGRAM UPDATE METHOD

CROSS-REFERENCE OF RELATED APPLICATIONS

This application claims the benefit of Japanese Application No. 2018-006831, filed on Jan. 19, 2018, the entire disclosure of which Application is incorporated by reference herein.

BACKGROUND

1. Technical Field

The present disclosure relates to, in a lighting system of controlling a plurality of luminaires, a system of updating a control program of each of the luminaires, an update method, and an update device and a lighting device for use with the system.

2. Description of the Related Art

A lighting system that controls a plurality of lighting devices using a single wireless operation device has been conventionally developed. For example, PTL 1 discloses a lighting system that controls a plurality of grouped lighting devices by a controller. PTL 1 also discloses a setting device that is communicable with the controller and receives operations for controlling the dimming level and brightness of the lighting devices.

CITATION LIST

Patent Literature

PTL 1: Unexamined Japanese Patent Publication No. 2017-123319

SUMMARY

In a conventional lighting system that controls a plurality of lighting devices by a wireless operation device, lighting devices must be replaced for the purpose of adding new functions to the lighting devices or modifying control programs of the lighting devices. When the lighting devices are replaced with new devices, the costs are incurred and it is necessary to pair the lighting device with the wireless operation device again.

The present disclosure has been achieved in view of the problems. An object of the present disclosure is to provide a lighting control program update system that can add a new function to a lighting device or modify a control program of the lighting device without replacing the lighting device.

Another object of the present disclosure is to provide an update device for use with the lighting control program update system that can add a new function to a lighting device or modify a control program of the lighting device without replacing the lighting device.

Yet another object of the present disclosure is to provide a lighting control program update method that can add a new function to a lighting device or modify a control program of the lighting device without replacing the lighting device.

Yet another object of the present disclosure is to provide a lighting device that can update a control program in response to an instruction to update a control program including ID information that matches ID information allocated to the lighting device and that can easily inform a user of an update state by an illumination state.

In order to solve the above problems, a lighting control program update system according to the present disclosure includes a wireless operation device that outputs an operation instruction including first wireless operation device ID information, a plurality of lighting devices each of which stores second wireless operation device ID information, receives the operation instruction, and performs an operation based on the operation instruction when the first wireless operation device ID information included in the operation instruction matches second wireless operation device ID information, and an update device that broadcasts a control program update instruction including third wireless operation device ID information that is identical to the first wireless operation device ID information to the plurality of lighting devices. When the third wireless operation device ID information included in the control program update instruction matches the second wireless operation device ID information stored in the lighting devices, each of the plurality of lighting devices updates a control program stored in the lighting device in response to the control program update instruction.

An update device according to the present disclosure acquires, from a wireless operation device, first wireless operation device ID information and stores the first wireless operation device ID information as third wireless operation device ID information. When the first wireless operation device ID information included in an operation instruction output from the wireless operation device matches second wireless operation device ID information stored in each of a plurality of lighting devices, each of the plurality of lighting devices performs an operation based on the operation instruction. When the third wireless operation device ID information included in a control program update instruction matches the second wireless operation device ID information stored in each of the plurality of lighting devices, each of the plurality of lighting devices updates a control program stored in the lighting device in response to the control program update instruction. The update device broadcasts the control program update instruction to the lighting devices.

According to a lighting device of the present disclosure, when first wireless operation device ID information included in an operation instruction output from a wireless operation device matches second wireless operation device ID information stored in the lighting device, the lighting device performs an operation based on the operation instruction. When third wireless operation device ID information that is included in a control program update instruction broadcasted by an update device and is identical to the first wireless operation device ID information matches the second wireless operation device ID information stored in the lighting device, the lighting device updates a control program stored in the lighting device in response to the control program update instruction. The lighting device emits light based on a progress of updating the control program.

A lighting control program update method according to the present disclosure updates a control program stored in each of a plurality of lighting devices. When first wireless operation device ID information included in an operation instruction output from a wireless operation device matches second wireless operation device ID information stored in each of the plurality of lighting devices, each of the plurality of lighting devices performs an operation based on the operation instruction. The lighting control program update method includes an acquisition step of causing an update device to acquire the first wireless operation device ID information and to store the first wireless operation device ID information as third wireless operation device ID information, an output step of causing the update device to broadcast a control program update instruction including the third wireless operation device ID information to the plurality of lighting devices, and an update step of causing each of the plurality of lighting devices to update a control program stored in the lighting device in response to the control program update instruction when the third wireless operation device ID information included in the control program update instruction matches the second wireless operation device ID information stored in each of the plurality of lighting devices.

With the lighting control program update system according to the present disclosure, it is possible to add a new function to the lighting device or modify the control program of the lighting device without replacing the lighting device.

With the update device according to the present disclosure, it is possible to add a new function to the lighting device or modify the control program of the lighting device without replacing the lighting device. With the lighting control program update method according to the present disclosure, it is possible to add a new function to the lighting device or modify the control program of the lighting device without replacing the lighting device.

With the lighting device according to the present disclosure, it is possible to update the control program in response to the control program update instruction including the third wireless operation device ID information that matches the second wireless operation device ID information allocated to the lighting device and to easily inform a user of an update state by an illumination state.

DETAILED DESCRIPTION

Figure 1:
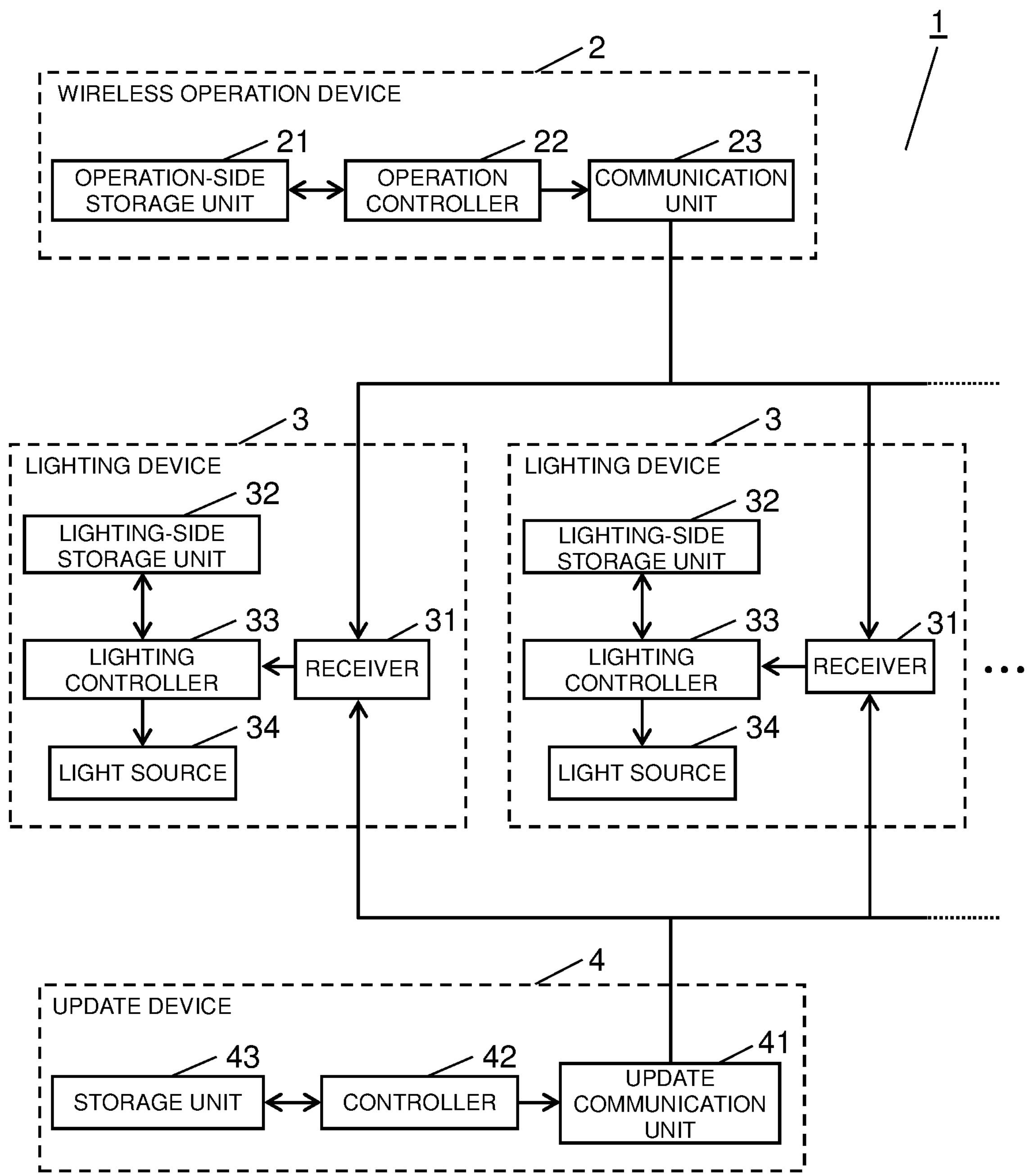
FIG. 1 is a schematic block diagram of a lighting control program update system according to a first exemplary embodiment.

A lighting control program update system, a lighting control program update method, an update device, and a lighting device according to exemplary embodiments will be described in detail below with reference to the drawings. The exemplary embodiments described below illustrate examples of the present disclosure only. Numeric values, constituent elements, and operations are also examples only, and are not intended to limit the present disclosure.

The drawings are schematically illustrated and thus are not strictly accurate. In the drawings, substantially identical configurations are denoted by identical reference numerals, and overlapped descriptions may be omitted or simplified.

(First Exemplary Embodiment)

Figure 2:
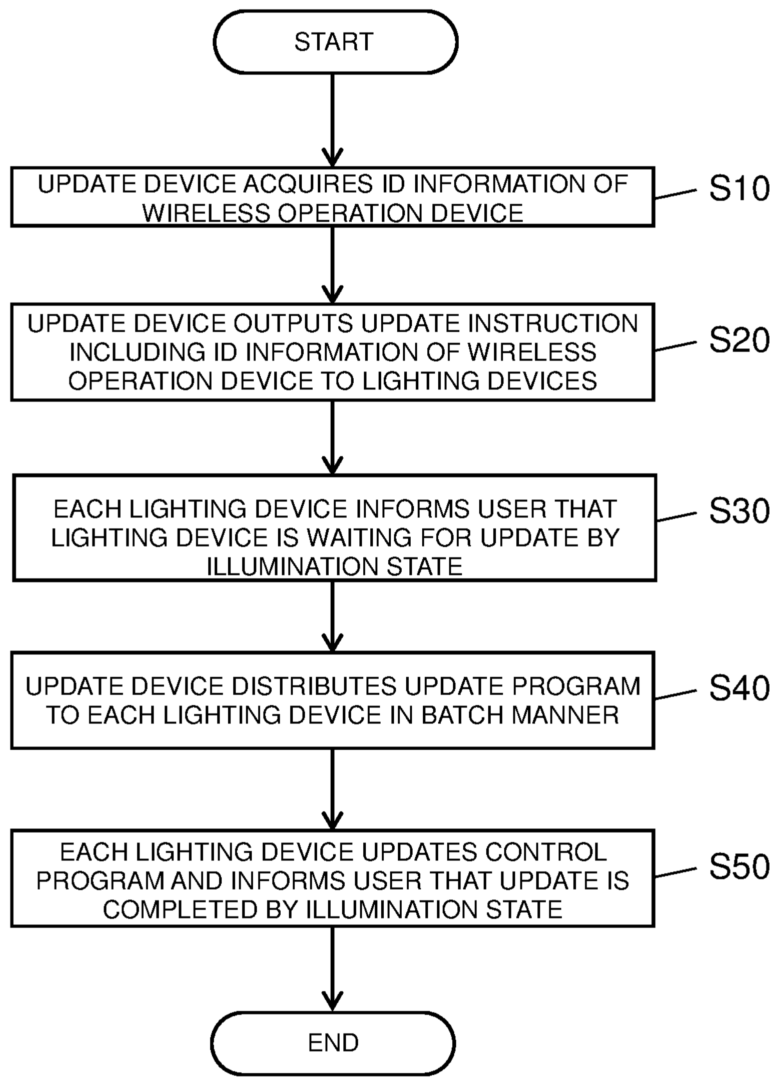
FIG. 2 is a flowchart illustrating an example of an operation of the lighting control program update system according to the first exemplary embodiment.

Lighting control program update system 1 according to a first exemplary embodiment will be described below with reference to FIGS. 1 and 2. FIG. 1 is a schematic block diagram of the lighting control program update system according to the first exemplary embodiment. FIG. 2 is a flowchart illustrating an example of an operation of the lighting control program update system according to the first exemplary embodiment.

[Configuration]

In a lighting system that manages a plurality of lighting devices 3 in a batch manner at offices, commercial facilities, or the like, lighting control program update system 1 can be used for updating a control program installed in each of lighting devices 3. For example, lighting control program update system 1 can be used when a new function is added to lighting devices 3 that have been already installed to the facilities, when the control program installed in lighting devices 3 are modified, or other cases. Examples of the function to be added to lighting device 3 include "timer function" that enables lighting device 3 to automatically turn on or off at a predetermined time, and the like.

Alternatively, it is possible to add a new function of causing lighting devices 3 to cooperate with other devices with a communication function or the like to lighting devices 3. For example, by causing lighting devices 3 to cooperate with a microphone device with a communication function, it is possible to control lighting devices 3 by voice input. Moreover, by transmitting an illumination state of lighting devices 3 to an external server or the like, it is possible to check a state of living in a family or the like from a remote location.

Lighting control program update system 1 achieves addition of functions to lighting devices 3 or modification of the control program installed in lighting devices 3 without replacing lighting devices 3. Lighting control program update system 1 includes a lighting system including wireless operation device 2 and a plurality of lighting devices 3 and update device 4.

Such a lighting system can be employed for operating lighting devices 3 in a batch manner in a relatively large room such as an office or a commercial facility. When a large number of lighting devices 3 are installed to a facility, these lighting devices 3 are grouped and at least one wireless operation device 2 is allocated to each group. It is needless to mention that when a relatively small number of lighting devices 3 are installed to a room, all lighting devices 3 in the room may be operated by single wireless operation device 2.

Wireless operation device 2 can be used for operating lighting devices 3 in a batch manner. Wireless operation device 2 stores a first wireless operation device ID that identifies wireless operation device 2. Wireless operation device 2 outputs an operation instruction including first wireless operation device ID information to lighting devices 3. Each lighting device 3 stores second wireless operation device ID information that is identical to the first wireless operation device ID of wireless operation device 2 which is allocated to each lighting device 3. Each lighting device 3 operates in response to an operation instruction including the first wireless operation device ID that matches the second wireless operation device ID stored in lighting device 3.

Update device 4 can be used for updating control programs of lighting devices 3 in a batch manner. Update device 4 acquires the first wireless operation device ID information of wireless operation device 2 and stores the first wireless operation device ID information as third wireless operation device ID information. Update device 4 broadcasts a control program update instruction including the third wireless operation device ID information to lighting devices 3. Each lighting device 3 updates the control program in response to a control program update instruction including the third wireless operation device ID information that matches the second wireless operation device ID information stored in lighting device 3.

Constituent elements of lighting control program update system 1 will be described below in further detail. The first wireless operation device ID information is referred to as first ID information. The second wireless operation device ID information is referred to as second ID information. The third wireless operation device ID information is referred to as third ID information.

[Wireless Operation Device]

Wireless operation device 2 can be used for operating lighting devices 3 in a batch manner in the lighting system. Wireless operation device 2 outputs an operation instruction including first ID information of wireless operation device 2 to lighting devices 3. A user of the lighting system operates wireless operation device 2 to turn on or off lighting devices 3 allocated to wireless operation device 2 or to control dimming and tuning of lighting devices 3.

The first ID information of wireless operation device 2 is information that identifies wireless operation device 2, and for example, a serial number, an internet protocol (IP) address, and a media access control (MAC) address of wireless operation device 2 can be used as the first ID information. In the first exemplary embodiment, the MAC address is used as the first ID information. Once given, the MAC address is not changed and thus can be reliably used as the ID information of wireless operation device 2. In addition to the MAC address and the like, an identification number that is assigned in a manner specifically designed for the lighting system may be given to wireless operation device 2 as the first ID information.

Wireless operation device 2 includes operation-side storage unit 21, operation controller 22, and communication unit 23. Operation-side storage unit 21 is a storage device such as a memory or a hard disk. Operation-side storage unit 21 stores programs for controlling lighting devices 3 and the first ID information. Operation-side storage unit 21 may be an external server disposed outside wireless operation device 2 or the like. When the external server or the like is used as operation-side storage unit 21, data is received or transmitted between operation-side storage unit 21 and operation controller 22 through communication unit 23.

Operation controller 22 is a processor such as a central processing unit (CPU). Operation controller 22 controls wireless operation device 2. Operation controller 22 also executes a program stored in operation-side storage unit 21 to create an operation instruction to operate lighting devices 3. Communication unit 23 performs wireless communication with lighting devices 3 by radio waves or the like. The operation instruction created by operation controller 22 is output from communication unit 23 to lighting devices 3.

[Lighting Device]

Each lighting device 3 can be used for illuminating a place where lighting device 3 is installed by its light source. In the first exemplary embodiment, the lighting system includes the plurality of lighting devices 3. In the first exemplary embodiment, single wireless operation device 2 is allocated to the plurality of lighting devices 3. That is, single wireless operation device 2 can operate lighting devices 3 at the same time. Lighting device 3 stores the first ID information of wireless operation device 2 allocated to lighting device 3 as the second ID information. In response to an operation instruction including the first ID information that is identical to the second ID information stored in lighting device 3, lighting device 3 turns on or off light source 34 or changes the dimming and tuning of lighting device 3.

Lighting device 3 includes receiver 31, lighting-side storage unit 32, lighting controller 33, and light source 34. Receiver 31 can perform wireless communication by radio waves or the like. Lighting-side storage unit 32 is a storage device such as a memory or a hard disk. Lighting-side storage unit 32 stores a control program for controlling an operation of lighting device 3 and the second ID information. The second ID information is identical to the first ID information of wireless operation device 2 allocated to lighting device 3. As described above, single wireless operation device 2 is allocated to the plurality of lighting devices 3 in the first exemplary embodiment. Lighting devices 3 store the common second ID information.

Lighting controller 33 is a processor such as a central processing unit (CPU). Lighting controller 33 executes a control program stored in lighting-side storage unit 32 to control lighting device 3. Specifically, lighting controller 33 checks the first ID information included in an operation instruction received from wireless operation device 2 against the second ID information stored in lighting-side storage unit 32. When the first ID information matches the second ID information, lighting controller 33 operates in response to the operation instruction. For example, lighting controller 33 generates a control signal for controlling light source 34 and outputs the control signal to light source 34. Light source 34 operates in response to the control signal from lighting controller 33. When the first ID information does not match the second ID information, lighting controller 33 discards the operation instruction. Examples of light source 34 include a light emitting diode (LED), a fluorescent lamp, and an incandescent lamp.

Lighting controller 33 also updates the control program stored in lighting-side storage unit 32 in response to a control program update instruction received from update device 4. Specifically, lighting controller 33 checks third ID information included in the control program update instruction received from update device 4 against the second ID information stored in lighting-side storage unit 32. When the third ID information matches the second ID information, lighting controller 33 updates the control program in response to the control program update instruction. When the third ID information does not match the second ID information, lighting controller 33 discards the control program update instruction.

[Update Device]

Update device 4 can be used for updating control programs stored in lighting devices 3 in a batch manner. Update device 4 acquires the first ID information from wireless operation device 2 and stores the first ID information as the third ID information. Update device 4 also outputs a control program update instruction including the third ID information. Lighting device 3 updates a control program in response to a control program update instruction including the third ID information that is identical to the second ID information stored in lighting device 3.

Update device 4 includes update communication unit 41, controller 42, and storage unit 43. Update communication unit 41 performs wireless communication by radio waves or the like. Update communication unit 41 broadcasts a control program update instruction including the third ID information to lighting devices 3 through wireless communication. Update device 4 distributes an update program for entirely or partially updating a control program to lighting devices 3 through update communication unit 41 in a batch manner. Examples of the distribution system include a broadcast system and a multicast system.

Controller 42 is a processor such as a central processing unit (CPU). Controller 42 controls update device 4. Controller 42 also executes a program stored in storage unit 43 to create a control program update instruction including the third ID information. Storage unit 43 is a storage device such as a memory or a hard disk. Storage unit 43 stores the first ID information of wireless operation device 2, which has been acquired, as the third ID information. Storage unit 43 also stores a program for creating the control program update instruction.

Update device 4 acquires the first ID information of wireless operation device 2. The acquired first ID information of wireless operation device 2 is stored in storage unit 43 as the third ID information, and is used when a control program update instruction is created by controller 42.

In the first exemplary embodiment, update device 4 wirelessly communicates with wireless operation device 2 to acquire the first ID information of wireless operation device 2. Specifically, wireless operation device 2 outputs a predetermined output signal containing the first ID information. Update device 4 receives the predetermined output signal at update communication unit 41 and acquires the first ID information of wireless operation device 2 from the predetermined output signal.

The predetermined output signal may be any output signal. For example, the predetermined output signal may be an operation instruction to operate lighting device 3. Note that the predetermined output signal is preferably an operation instruction for a special operation such as an operation of turning off lighting device 3 for three seconds and then turning on lighting device 3 for two seconds. This enables update device 4 to easily distinguish a signal for acquiring the first ID information from other signals.

It is not necessary for the predetermined output signal to be the operation instruction to operate lighting device 3. For example, the predetermined output signal may be a signal that does not affect an operation of lighting device 3 such as a test signal. For example, wireless operation device 2 may transmit a test signal containing the first ID information. Update device 4 may acquire the first ID information of wireless operation device 2 from the test signal.

The method of acquiring the first ID information of wireless operation device 2 is not limited to the method of acquiring the ID information of wireless operation device 2 by receiving the predetermined output signal from wireless operation device 2, as described above. For example, update device 4 may include an input unit that receives input from a user such as a keyboard or a touch panel. The user can input the first ID information such as an MAC address of wireless operation device 2 through the input unit.

[Operation]

An example of a control program update operation in lighting control program update system 1 according to the first exemplary embodiment will be described below with reference to a flowchart of FIG. 2.

In the control program update operation of lighting control program update system 1, update device 4 first acquires first ID information of wireless operation device 2 (step S10). At step S10, wireless operation device 2, which has received an instruction from a user, outputs a predetermined output signal. The predetermined output signal contains the first ID information. Update communication unit 41 in update device 4 receives the predetermined output signal from wireless operation device 2 and acquires the first ID information of wireless operation device 2 from the output signal. Storage unit 43 stores the first ID information of wireless operation device 2 as third ID information.

An operation instruction output from wireless operation device 2 includes the first ID information of wireless operation device 2. The plurality of lighting devices 3 operate in response to an operation instruction including the first ID information that matches second information stored in lighting devices 3. By receiving an operation instruction that is the predetermined output signal from wireless operation device 2, update device 4 can acquire the first ID information of wireless operation device 2.

Examples of the predetermined output signal include an operation instruction to turn off lighting device 3 for three seconds and then turn on lighting device 3 for two seconds and an operation instruction to change dimming of lighting device 3 for a predetermined period. Alternatively, the predetermined output signal may be a test signal that does not affect an operation of lighting device 3. The predetermined output signal may be any signal.

In addition, update device 4 may have a function of displaying information about wireless operation device 2 identified by the first ID information acquired. Examples of such information include the first ID information itself and a model name of wireless operation device 2. The user can easily check wireless operation device 2 linked to update device 4.

Update device 4 then broadcasts an instruction to update a control program of lighting device 3 to lighting devices 3 through update communication unit 41 (step S20). The instruction includes third ID information identical to the first ID information acquired at step S10. The control program update instruction is created by controller 42 using the third ID information stored in storage unit 43.

The control program update instruction output from update device 4 preferably includes a change instruction to change a receiving frequency band of each lighting device 3. Communication for updating the control program of lighting device 3 requires more communication capacity than common communication for operating lighting device 3. If a wider frequency band is used to perform communication for updates, the control program can be updated smoothly. If a wider frequency band is used to perform communication for updates, however, in a case where other surrounding wireless devices are present, the frequency band used for updates may overlap frequency bands of the other wireless devices.

As the control program update instruction output from update device 4 includes a change instruction to change the receiving frequency band of lighting device 3, it is possible to prevent the frequency band for updates from overlapping the frequency bands of other wireless devices. By preventing overlapping of frequency bands as described above, the control program of lighting device 3 can be updated smoothly.

Lighting devices 3 receive the control program update instruction including the third ID information and check the third ID information against the second ID information. When the third ID information matches the second ID information, lighting devices 3 update the control program in response to the control program update instruction. In the first exemplary embodiment, a process of updating the control program includes a preparation for an update and downloading of the update program. Specifically, in the preparation for an update, lighting devices 3 delete the control program that has been already stored in lighting-side storage unit 32. When the control program update instruction includes a change instruction to change a frequency band, lighting devices 3 change the receiving frequency band of receiver 31 in the preparation for an update. Specifically, lighting devices 3 change the receiving frequency band from a first frequency band used for transmitting and receiving the control program update instruction to a second frequency band that is different from the first frequency band. The first frequency band may be used for transmitting and receiving not only the control program update instruction but also the operation instruction. The second frequency band is used for transmitting and receiving the update program.

In the first exemplary embodiment, a program including a main program for lighting control and a management code that includes the checksum and size of the main program is deleted from a ROM in lighting-side storage unit 32 in the preparation for an update. Meanwhile, a program such as a boot loader or a downloader is not deleted.

Lighting device 3 in which the preparation for an update is completed informs the user that lighting device 3 is waiting for an update by an illumination state (step S30). With this configuration, the user can visually check that the preparation for an update is completed in lighting device 3 and lighting device 3 is waiting for distribution of the update program.

It is possible to use any illumination state of lighting device 3 that notifies the user that lighting device 3 is waiting for an update. For example, it is possible to use the illumination state of lighting device 3 in which lighting device 3 repeatedly turns on and off every fixed period (for example, every second or every three seconds). Alternatively, when lighting device 3 fails to prepare for an update, it is possible to inform the user of the failure by any illumination state of lighting device 3 that can be appropriately set such as by turning off of lighting device 3.

Update device 4 then distributes an update program for the control program of lighting device 3 to lighting devices 3 in a batch manner through update communication unit 41 using a broadcast system or a multicast system (step S40). Lighting device 3 in which the control program has been updated informs the user that the update is completed by the illumination state (step S50).

Any illumination state of lighting device 3 that informs the user that an update is completed may be used. For example, it is possible to use an illumination state of lighting device 3 in which lighting device 3 seems to always turn on with human eyes after the update is completed. Alternatively, it is possible to use an illumination state of lighting device 3 in which lighting device 3 turns on a predetermined color (for example, red) for a fixed period of time. Moreover, it is possible to inform the user that the update fails in lighting device 3 by turning off lighting device 3.

Alternatively, it is possible to inform the user of a progress of updating the control program by the illumination state of lighting device 3. For example, as the update of the control program progresses, the period of turning on and off lighting device 3 may become shorter, and when the update is completed, lighting device 3 seems to always turn on with human eyes.

In addition to notifying the user of the state of waiting for an update or the progress of an update by turning on and off lighting device 3, for example, it is possible to notify the user of these states by using the brightness or emission color of lighting device 3. For example, as an update progresses, lighting device 3 may become bright, or when the update is completed, lighting device 3 may turn on red.

As the update state of the control program is notified to the user by the illumination state of each lighting device 3 as described above, the user can check the update state of each lighting device 3 or completion of the update in each lighting device 3 only by looking at each lighting device 3.

The update program distributed from update device 4 includes a program that corresponds to or is substituted for the program deleted in the preparation for an update. In the first exemplary embodiment, the update program includes the main program for lighting control and the management code including the checksum and size of the main program.

In storing the update program in lighting-side storage unit 32, reception data is temporarily stored in a RAM on a frame basis and every time the size of the data temporarily stored in the RAM is a block size, the data is stored from the RAM into a ROM in the first exemplary embodiment. By using the checksum included in the update program, lighting device 3 can determine whether the update program is normally downloaded.

A case where the control program of lighting device 3 is smoothly updated has been described above. An operation of lighting control program update system 1 according to the first exemplary embodiment in a case where the update of the control program fails in some lighting devices 3 will be described below.

For example, when there are some lighting devices 3 in which a preparation for an update fails between step S20 and step S30, a user can find lighting devices 3 in which the preparation for an update fails by the illumination state of such lighting devices 3. In the first exemplary embodiment, the update program is distributed to lighting devices 3 in which the preparation for an update is completed at step S40.

When there are some lighting devices 3 in which the preparation for an update fails, an update instruction may be repeatedly output from update device 4 until it is checked that the preparation for an update is completed in all lighting devices 3.

When the update of the control program fails in some of lighting devices 3 between step S40 and step S50, the user can find lighting devices 3 in which the update of the control program fails by the illumination state of such lighting devices 3. In this case, the update of the control program is temporarily completed in remaining lighting devices 3 in the first exemplary embodiment.

An update instruction including the ID information of wireless operation device 2 is then output again from update device 4 to lighting device 3 in which the preparation for an update fails and/or lighting device 3 in which the update of the control program fails, so that the control program is updated. An update operation performed again is similar to the update operation described above except for the method of outputting an update instruction and the method of distributing an update program.

The update instruction is output again to lighting devices 3 in which the preparation for an update fails or the update of the control program fails. When the preparation for an update fails or the update of the control program fails in single lighting device 3, the update program to be distributed again is distributed by the unicast system. When the preparation for an update fails or the update of the control program fails in a plurality of lighting devices 3, the update program is distributed again to lighting devices 3 in which the preparation for an update fails or the update of the control program fails by the multicast system.

The above description has been given of a flow of rewriting an update program by using an example of a conventional method of rewriting a program. The flow of rewriting an update program is not limited to that described above. In rewriting an update program, various conventional program rewriting methods can be used.

[Advantageous Effects Of Lighting Control Program Update System According To Exemplary Embodiment]

An essential point of lighting control program update system 1 according to the first exemplary embodiment will be described again.

Lighting control program update system 1 according to the first exemplary embodiment includes wireless operation device 2, the plurality of lighting devices 3, and update device 4. Wireless operation device 2 outputs an operation instruction including first wireless operation device ID information. When the first wireless operation device ID information included in the operation instruction matches second wireless operation device ID information stored in each lighting device 3, each lighting device 3 performs an operation in response to the operation instruction. Update device 4 broadcasts a control program update instruction including third wireless operation device ID information that is identical to the first wireless operation device ID information to lighting devices 3. When the third wireless operation device ID information included in the control program update instruction matches the second wireless operation device ID information stored in each lighting device 3, each lighting device 3 updates a control program stored in response to the control program update instruction.

With lighting control program update system 1 configured as described above, it is possible to add a new function to lighting device 3 or modify the control program of lighting device 3 without replacing lighting device 3.

In lighting control program update system 1 according to the first exemplary embodiment, wireless operation device 2 preferably outputs a predetermined output signal containing the first wireless operation device ID information. Update device 4 preferably receives the predetermined output signal and acquires the first wireless operation device ID information in the predetermined output signal for the purpose of generating the third wireless operation device ID information.

With the above configuration, update device 4 can easily acquire the first wireless operation device ID information only by receiving the predetermined output signal from wireless operation device 2, without requiring any input from a user or the like.

In lighting control program update system 1 according to the first exemplary embodiment, the predetermined output signal is preferably a test signal that does not affect an operation of each of lighting devices 3.

With the above configuration, the predetermined output signal prevents lighting device 3 from being operated differently from a normal operation. Consequently, if any person is present in a space where lighting device 3 is turned on, update device 4 can acquire the first wireless operation device ID information without causing that person to have an unpleasant feeling.

In lighting control program update system 1 according to the first exemplary embodiment, each of lighting devices 3 preferably emits light based on a progress of updating the control program.

With the above configuration, a user can easily check an update state of each lighting device 3 or completion of an update in each lighting device 3 only by looking at that lighting device 3.

In lighting control program update system 1 according to the first exemplary embodiment, the control program update instruction preferably includes a change instruction to change a frequency band for wireless communication from a first frequency band used for wirelessly transmitting and receiving the control program update instruction to a second frequency band different from the first frequency band. Lighting devices 3 preferably change the frequency band for wireless communication from the first frequency band to the second frequency band in response to the change instruction.

With the above configuration, it is possible to prevent the frequency band for wireless communication from overlapping frequency bands of other wireless devices, and thus the control program of lighting device 3 can be smoothly updated.

In lighting control program update system 1 according to the first exemplary embodiment, update device 4 may output an update program for entirely or partially updating the control program by using the second frequency band. The lighting devices may receive the update program by using the second frequency band.

The above configuration enables the update program to be smoothly distributed.

(Other Exemplary Embodiments)

Lighting control program update system 1 according to the present disclosure has been described with reference to the first exemplary embodiment. However, the present disclosure is not limited to lighting control program update system 1 according to the first exemplary embodiment. For example, the present disclosure is useful as update device 4, lighting device 3, and a lighting control program update method.

Update device 4 according to exemplary embodiments acquires, from wireless operation device 2, first wireless operation device ID information for the purpose of generating third wireless operation device ID information that is identical to the first wireless operation device ID information. Update device 4 also broadcasts a control program update instruction to a plurality of lighting devices 3. When the first wireless operation device ID information included in an operation instruction output from wireless operation device 2 matches the second wireless operation device ID information stored in lighting devices 3, lighting devices 3 perform an operation based on the operation instruction. When the third wireless operation device ID information included in the control program update instruction matches the second wireless operation device ID information stored in lighting devices 3, lighting devices 3 update a control program stored in response to the control program update instruction.

With update device 4 configured as described above, it is possible to add a new function to lighting device 3 or modify the control program of lighting device 3 without replacing lighting device 3.

When first wireless operation device ID information included in an operation instruction output from wireless operation device 2 matches second wireless operation device ID information stored in lighting device 3, lighting device 3 according to the exemplary embodiments perform an operation based on the operation instruction. Moreover, when third wireless operation device ID information that is included in a control program update instruction broadcasted by update device 4 and is identical to the first wireless operation device ID information matches the second wireless operation device ID information stored in lighting device 3, lighting device 3 updates a control program stored in response to the control program update instruction. Lighting device 3 emits light based on a progress of updating the control program.

With lighting device 3 configured as described above, it is possible to update the control program in response to the control program update instruction including the third wireless operation device ID information that matches the second wireless operation device ID information allocated to lighting device 3 and to easily inform a user of an update state by an illumination state.

In lighting device 3 according to the exemplary embodiments, the update instruction preferably includes a change instruction to change a frequency band for wireless communication from a first frequency band used for wirelessly transmitting and receiving the control program update instruction to a second frequency band different from the first frequency band. Lighting device 3 according to the exemplary embodiments preferably changes the frequency band for wireless communication from the first frequency band to the second frequency band in response to the change instruction.

With the above configuration, it is possible to prevent a frequency band used for an update from overlapping frequency bands of other wireless devices, and thus the control program of lighting device 3 can be smoothly updated.

The lighting control program update method according to the exemplary embodiments is a method of updating a control program stored in each of a plurality of lighting devices 3. When first wireless operation device ID information included in an operation instruction output from wireless operation device 2 matches second wireless operation device ID information stored in lighting devices 3, lighting devices 3 perform an operation based on the operation instruction. The lighting control program update method includes an acquisition step, an output step, and an update step. The acquisition step causes update device 4 to acquire the first wireless operation device ID information and to store the first wireless operation device ID information as third wireless operation device ID information. The output step causes update device 4 to broadcast a control program update instruction including the third wireless operation device ID information acquired at the acquisition step to lighting devices 3. When the third wireless operation device ID information included in the control program update instruction output at the output step matches the second wireless operation device ID information stored in lighting devices 3, the update step causes lighting devices 3 to update a control program stored in response to the control program update instruction.

With the lighting control program update method configured as described above, it is possible to add a new function to lighting device 3 or modify the control program of lighting device 3 without replacing lighting device 3.

In the lighting control program update method according to the exemplary embodiments, lighting devices 3 preferably emit light based on a progress of updating the control program.

With the above configuration, a user can easily check an update state of each lighting device 3 or completion of an update in each lighting device 3 only by looking at that lighting device 3.

The first exemplary embodiment has described that update device 4 includes update communication unit 41, controller 42, and storage unit 43. Update device 4 may include all these constituent elements or some of the constituent elements may be provided as a separate unit.

As a mode of update device 4 in which some of the constituent elements are provided as a separate unit, update device 4 may be configured by connecting a dedicated device including update communication unit 41 capable of performing broadcast or multicast communication to an electronic computer such as a personal computer (PC), for example. In this case, a memory or a hard disk in a PC or the like may be used as storage unit 43 and a CPU in the PC or the like may be used as controller 42.

In the description of the operation of the first exemplary embodiment, it is not necessary for a user to visually check a state of waiting for an update or a progress of updating a control program in lighting device 3 by the illumination state of lighting device 3, but it is preferable to achieve such a configuration in view of user-friendliness. The broadcast system or the multicast system distributes an update program to a large number of lighting devices 3 at the same time. It is thus not easy to receive completion of an update from all lighting devices 3. For this reason, it is configured such that the user can visually check the state of waiting for an update or the progress of updating the control program by the illumination state of lighting device 3. As a result, if a large number of lighting devices 3 are provided, the user can easily check the progress of the update.

The exemplary embodiments described above are given simply for the purpose of illustration of the exemplary embodiments of the present disclosure, and numeric values, constituent elements, and operations are also given only for illustrating preferable modes. Therefore, the present disclosure is not limited only to these exemplary embodiments. The configuration may be modified as appropriate without departing a range of a technical thought of the present disclosure.

What is claimed is:

1. A lighting control program update system comprising:

a wireless operation device that outputs an operation instruction including first wireless operation device ID information;

a plurality of lighting devices each of which stores second wireless operation device ID information, receives the operation instruction, and performs an operation based on the operation instruction when the first wireless operation device ID information included in the operation instruction matches second wireless operation device ID information; and an update device that broadcasts a control program update instruction including third wireless operation device ID information that is identical to the first wireless operation device ID information to the plurality of lighting devices, wherein when the third wireless operation device ID information included in the control program update instruction matches the second wireless operation device ID information stored in the lighting devices, each of the plurality of lighting devices updates a control program stored in the lighting device in response to the control program update instruction.

2. The lighting control program update system according to claim 1, wherein the wireless operation device outputs a predetermined output signal containing the first wireless operation device ID information, and the update device receives the predetermined output signal, acquires the first wireless operation device ID information in the predetermined output signal, and stores the first wireless operation device ID information as third wireless operation device ID information.

3. The lighting control program update system according to claim 2, wherein the predetermined output signal is a test signal that does not affect an operation of each of the plurality of lighting devices.

4. The lighting control program update system according to claim 1, wherein each of the plurality of lighting devices emits light based on a progress of updating the control program.

5. The lighting control program update system according to claim 1, wherein the control program update instruction includes a change instruction to change a frequency band for wireless communication from a first frequency band used for wirelessly transmitting and receiving the control program update instruction to a second frequency band different from the first frequency band, and each of the plurality of lighting devices changes the frequency band for wireless communication from the first frequency band to the second frequency band in response to the change instruction.

6. The lighting control program update system according to claim 5, wherein the update device outputs an update program for entirely or partially updating the control program using the second frequency band, and each of the plurality of lighting devices receives the update program using the second frequency band.

7. An update device that acquires, from a wireless operation device, first wireless operation device ID information, stores the first wireless operation device ID information as third wireless operation device ID information, and broadcasts a control program update instruction to a plurality of lighting devices, when the first wireless operation device ID information included in an operation instruction output from the wireless operation device matches second wireless operation device ID information stored in each of the plurality of lighting devices, each of the plurality of lighting devices performing an operation based on the operation instruction, when the third wireless operation device ID information included in the control program update instruction matches the second wireless operation device ID information stored in each of the plurality of lighting devices, each of the plurality of lighting devices updating a control program stored in the lighting device in response to the control program update instruction.

8. A lighting device that, when first wireless operation device ID information included in an operation instruction output from a wireless operation device matches second wireless operation device ID information stored in the lighting device, performs an operation based on the operation instruction, when third wireless operation device ID information that is included in a control program update instruction broadcasted by an update device and is identical to the first wireless operation device ID information matches the second wireless operation device ID information stored in the lighting device, updates a control program stored in the lighting device in response to the control program update instruction, and emits light based on a progress of updating the control program.

9. The lighting device according to claim 8, wherein the control program update instruction includes a change instruction to change a frequency band for wireless communication from a first frequency band used for wirelessly transmitting and receiving the control program update instruction to a second frequency band different from the first frequency band, and the lighting device changes the frequency band for wireless communication from the first frequency band to the second frequency band in response to the change instruction.

10. A lighting control program update method of updating a control program stored in each of a plurality of lighting devices, wherein when first wireless operation device ID information included in an operation instruction output from a wireless operation device matches second wireless operation device ID information stored in each of the plurality of lighting devices, each of the plurality of lighting devices performs an operation based on the operation instruction, the method comprising:

causing an update device to acquire the first wireless operation device ID information and to store the first wireless operation device ID information as third wireless operation device ID information;

the update device to broadcast a control program update instruction including the third wireless operation device ID information to the plurality of lighting devices; and causing each of the plurality of lighting devices to update a control program stored in the lighting device in response to the control program update instruction when the third wireless operation device ID information included in the control program update instruction matches the second wireless operation device ID information stored in each of the plurality of lighting devices.

11. The lighting control program update method according to claim 10, wherein each of the plurality of lighting devices emits light based on a progress of updating the control program.

* * * * *